United States Patent Office 2,967,837
Patented Jan. 10, 1961

2,967,837
COMPOSITIONS AND METHODS FOR CURING EPOXY RESINS

Jack Greenfield, Lake Hiawatha, N.J., assignor to Tung Research and Development League, Lyndhurst, N.J., a corporation of Louisiana No Drawing. Filed July 30, 1958, Ser. No. 751,834

10 Claims. (Cl. 260—18)

This invention relates to new polybasic acid compositions adapted for use as curing agents for epoxy resins and is directed particularly to compositions derived from vegetable oil acids and methods of producing and using such compositions.

In copending application Serial No. 751,845, filed July 30, 1958, now abandoned, there are described various types of polybasic vegetable oil derivatives which may be used as curing agents for epoxy resins. The reaction by which such curing agents are produced generally involves the treatment of polyunsaturated vegetable oils and vegetable oil acids with alpha beta unsaturated acids or anhydrides such as maleic acid or maleic anhydride for example. When vegetable oils themselves are used in such reactions, the products obtained are dibasic glycerides, whereas when the vegetable oil acids are used, the resulting products are tribasic acids.

While the compositions of said copending application have many advantages, the present invention is concerned with the formation and use of novel monoesters of the tribasic acids of the copending application. Thus, by esterifying one of the acid groups of tribasic acids produced from vegetable oil acids while leaving the other two acid groups available for reaction with epoxy groups, it is possible further to modify the curing agents and impart additional and important properties to epoxy resins produced therewith.

Accordingly, the principal object of the present invention is to provide improved curing agents for epoxy resins which are monoesters of tribasic acids derived from vegetable oils.

A further object of the invention is to provide new methods for producing and using such curing agents.

A specific object of the invention is to provide new monoesters of eleostearic acid adducts having important uses as curing and modifying agents for epoxy resins.

These and other objects and features of the present invention will appear from the following description thereof wherein typical compositions and procedures are cited for the purpose of indicating the nature of the invention but without intending to limit the scope of the invention thereby.

The formation of tribasic acids from diene vegetable oil acids can be effected as described in the copending application by heating polyunsaturated vegetable oil acids with alpha beta unsaturated dibasic acids such as maleic acid, maleic anhydride or fumaric acid.

The vegetable oil preferred is tung oil, and the vegetable oil acid preferred is eleostearic acid which is derived from tung oil in which it is present to the extent of about 80% of the oil. However, other vegetable oil acids may be employed as those derived from castor oil, soya bean oil, linseed oil, safflower oil, oiticia oil, tall oil, or the like.

The reaction which takes place on heating conjugated diene acids with alpha beta unsaturated dibasic acids may be represented by the following typical equation:

(1)
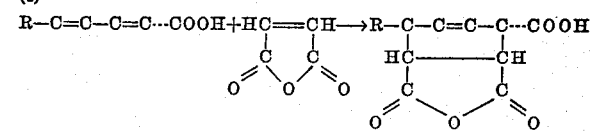

As illustrated by the foregoing equation, the tribasic acids may retain residual unsaturation. When maleic anhydride or other dibasic acids are used, the unsaturation occurs in the cyclic group produced. However, if the vegetable oil acid used contains three unsaturated groups, as in the case of eleostearic acid and linolenic acid for example, the tribasic acid adducts formed will also have residual unsaturation in the carbon chain attached to the cyclic group.

Any of the tribasic acids described above may be treated to esterify one of the carboxyl groups of the adduct to produce the desired monoester curing agents of the present invention. The ester group attached to the acid adduct may be selected and varied to provide a wide variety of curing agents characterized by the long chain nucleus of the vegetable oil together with substantially any desired type of ester group. Thus, the ester group may be methyl, ethyl, propyl, butyl, octyl, cetyl, stearyl or may be an unsaturated group, such as allyl, oleyl or the like, or may be cycloalkyl such as cyclohexyl, for example, or it may be an aryl group such as benzyl or the like.

Such esters may be produced by simple esterification reactions as by heating the tribasic acid adduct with the selected monohydric alcohol or by employing any other preferred esterification procedures. By employing monohydric alcohols in carrying out the esterification reaction and by using substantially equimolar proportions of the tribasic acid adducts, it is possible to esterify only a single acid group while the remaining carboxyl groups remain available for reaction with the epoxy resin to cure the same. The carboxyl group which is first esterified is that which is located in an intermediate position, whereby the carboxyl groups remaining in the esterified molecule are separated by a relatively large number of carbon atoms. The reaction, therefore, may be exemplified by the following equation:

(2)
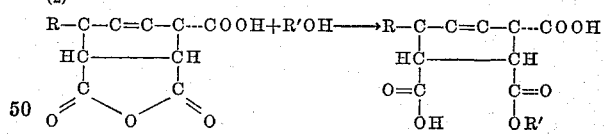

Since the acids derived from vegetable oils generally contain 11 or more carbon atoms in a straight chain, the polybasic monoesters of the present invention contain at least two carboxyl groups which are separated by at least 8 carbon atoms. As a result, it is possible to produce di-basic vegetable oil esters which are effective curing agents for epoxy resins and at the same time have the properties of plasticizers or modifying agents for controlling the characteristics of cured epoxy resins. The viscosity of the curing agent can be selectively controlled to provide a liquid or relatively soft curing agent facilitating the use thereof with epoxy compounds for molding, casting, spraying or other applications of the resin forming mixtures.

The nature of the curing agent can also be varied to alter the time and conditions of curing and to produce cured resins of improved plasticity, toughness, acid and alkali resistance and electrical properties.

In general, the curing agents of the present invention permit epoxy resin compositions to be sprayed, coated or otherwise applied to metal surfaces or to be cast or molded in any conventional manner. Curing can be effected by mild heating or by baking at elevated temperatures, and the conditions of the cure can be varied by suitable selection of the ester compound employed and by adjustment in the amount of the curing agent employed.

When the dibasic esters are unsaturated, the curing of the resin may be rendered more effective and complete by the prolonged or residual curing and polymerization afforded by the remaining double bond of the curing agent. Cross linkage and the formation of three dimensional polymers is facilitated whereby the toughness and strength of the cured resin may be increased.

The polybasic monoesters of the present invention are of general application in the curing of epoxy compounds to produce resins. Thus, the compounds herein referred to as epoxy resins may be any of the complex epoxides containing the terminal epoxy group

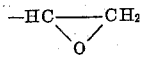

Such compounds are generally produced by reaction between polyhydric phenols and agents containing an epoxy or potentially epoxy group such as the polyfunctional halohydrins. Typical epoxy resins are those produced by reacting bis-phenol and epichlorhydrin in the presence of caustic soda. However, the polybasic vegetable oil monoesters of the present invention may be used in curing epoxy resins produced by any preferred method.

In order to illustrate typical and preferred procedures which may be employed in the practice of the present invention, the following representative examples are cited.

Example I 278 grams (1 mol) of tung oil acids were heated with 98 grams (1.0 mol) of maleic anhydride to a temperature of 175° C. for 30 minutes whereby substantially a quantitative yield of the tribasic acid adduct were obtained.

376 grams (1 mol) of the maleic-tung acid adduct were mixed with 32 grams (1 mol) of methanol and the mixture refluxed until the refluxing temperature reaches about 100° C. The resulting product was the methyl monoester of the tribasic acid adduct of tung oil and has a viscosity of Z3 at 25° C. (Gardner-Holdt system).

Example II 376 grams (1 mol) of the maleic-tung acid adduct of Example I was mixed with 256 grams of heptodecanol and the mixture heated to 100° C. for a period of about 30 minutes. The resulting heptodecanol monoester of the tribasic maleic-tung oil adduct had a viscosity of V at 25° C. (Gardner-Holdt system).

Example III

The process of Example I was repeated using 268 grams (1 mol) of linoleyl alcohol in place of the methanol whereby the linoleyl monoester of the tribasic tung acid adduct was produced having a viscosity of H on the Gardner-Holdt system.

Example IV

When benzyl alcohol was substituted for methanol in the method of Example I, the benzyl monoester of the tribasic acid adduct was produced and had a viscosity of Z on the Gardner-Holdt system.

Example V 60 parts of the heptodecanol ester of the maleic-tung acid adduct of Example II was mixed with 100 parts of the epoxy compound known as Araldite 6020 which is a product of reaction between bis-phenols and polyfunctional halohydrins. The resulting mixture was applied to a metal surface and baked at 150° C. for a period of about 20 minutes producting a hard, tough flexible film on the surface of the metal.

Example VI

A series of tests were conducted for the purpose of producing protective coatings or films formed of epoxy resins. For this purpose, the epoxy resin used was that known as Araldite 6071 which is a solid resinous material. This material, when dissolved in butyl carbitol to provide a 40% solids content, has a viscosity of C–G by the Gardner-Holdt method. It has a specific gravity of 1.19 at 25° C. and an epoxy equivalent of 0.21 per 100 grams.

70 parts of the 40% epoxy resin were mixed with 30 parts of a 40% solution of phthalic anhydride in carbitol and the mixture was then applied to a sheet of metal and cured for 2 hours at 275° F.

Additional mixtures were produced, applied and cured in the same manner, using the curing agents of Examples I, II and IV instead of phthalic anhydride, although the curing period was limited to 1 hour because the cure progressed more rapidly when using the vegetable oil derivatives of the present invention.

After curing the resin, each of the coated metal sheets was tested by bending the sheet about a mandrel ¼ inch in diameter. The resin cured with phthalic anhydride cracked and split off from the surface of the metal sheet when bent in this manner, whereas the resins cured by the use of the agents of Examples I, II and IV remained securely bonded to the metal and was not cracked or injured.

Even when the metal sheets were bent about a mandrel only ⅛ inch in diameter, the resins cured in accordance with the present invention were retained on the metal surface without material injury to the coating.

It is thus apparent that the monoester curing agents herein described serve to increase the flexibility and to improve the properties of epoxy resins cured thereby to a very marked extent and thereby give the resins greater utility than they have possessed heretofore.

The action of the curing agents on the epoxy resins may be varied considerably and will depend largely upon the composition of the tribasic acid and ester group of the curing agent as well as the characteristics and composition of the epoxy resin. The length of time and the temperature at which curing is effected will also vary but the curing time can generally be accelerated by the addition of small amounts of additional agents such as amines or amides. Thus, for example, the addition of 10% of diethylene triamine to the mixture will reduce the time of curing to a few minutes.

In general, the curing of epoxy resins can be effected in accordance with the present invention by simply heating or baking the resin for a period of from 10 or 15 minutes to 4 or 5 hours at temperatures of from about 100 to 250° C. The amount of curing agent used in any particular case will, of course, depend upon the epoxy resin employed and the character of the cured resinous product to be produced. The best results are generally obtained when using from about 30 to 60 parts of the curing agent to 100 parts of the epoxy resin, although the amount of the curing agent may be increased to equal the amount of the epoxy resin if desired.

It will be apparent from the foregoing description that the nature of the ester group and the vegetable oil tribasic acid from which the curing agents are produced can be varied greatly to obtain curing agents having a wide range of physical properties and to produce cured epoxy resins having new and improved properties.

In view thereof it should be understood that the particular compositions and procedures described above and cited in the examples are intended to be illustrative only and are not intended to limit the scope of the invention.

I claim:
1. The method of producing a curing agent for epoxy resin compositions which comprises the steps of heating together an acid derived from a vegetable oil which has a conjugated diene configuration and an alpha beta unsaturated dibasic acid until a tribasic acid adduct is formed, and thereafter esterifying one carboxyl group only of the resulting tribasic acid by heating together substantially equimolar proportions of a monohydric alcohol and said tribasic acid adduct.

2. The method of producing a curing agent for an epoxy resin composition which comprises the steps of heating eleostearic acid with an alpha beta unsaturated dibasic acid until a tribasic acid adduct is formed, and thereafter esterifying one carboxyl group only of the resulting tribasic acid by heating together substantially equimolar proportions of a monohydric alcohol and said tribasic acid adduct.

3. The method of producing a curing agent for an epoxy resin composition which comprises the steps of heating eleostearic acid until a tribasic acid adduct is formed and maleic anhydride together, and thereafter esterifying one carboxyl group only of the resulting tribasic acid by heating together substantially equimolar proportions of a monohydric alcohol and said tribasic acid adduct.

4. The method of curing an epoxy resin composition which comprises mixing with said composition a monoester of the adduct formed by heating a tribasic acid derived from a vegetable oil which has a conjugated diene configuration with an alpha beta unsaturated dibasic acid which ester is characterized by the presence of at least 8 carbon atoms between the unesterified carboxyl groups of the molecule, and heating the resulting mixture.

5. An epoxy resin resulting from the heating of an epoxy compound with a monoester of the tribasic acid product of reaction between eleostearic acid and maleic anhydride which ester is characterized by the presence of at least 8 carbon atoms between the unesterified carboxyl groups of the molecule.

6. A monoester of a tribasic acid characterized by the presence of two unesterified carboxyl groups separated by at least 8 carbon atoms, the ester group being positioned between said carboxyl groups.

7. A monoester of a tribasic acid characterized by the presence of two unesterified carboxyl groups separated by at least 8 carbon atoms, the ester group being positioned between said carboxyl groups, said ester being the product resulting from the heating together of substantially equimolar proportions of a monohydric alcohol and the adduct obtained by heating a vegetable oil acid with an alpha beta unsaturated dibasic acid.

8. The product defined by claim 7 wherein the alpha beta unsaturated acid is maleic acid.

9. The product defined by claim 7 wherein the vegetable oil acid is eleostearic acid.

10. A monoester of a tribasic acid resulting from esterification of the adduct formed by heating eleostearic acid with maleic anhydride, the esterification being effected by heating said adduct with a monohydric aliphatic alcohol, said ester being characterized by the presence of two unesterified carboxyl groups separated by ten carbon atoms with the ester group positioned between said carboxyl groups.

References Cited in the file of this patent

UNITED STATES PATENTS

| | | |
|---|---|---|
| 2,312,733 | Salathiel | Mar. 2, 1943 |
| 2,848,433 | Eirich | Aug. 19, 1958 |
| 2,858,323 | Smith | Oct. 28, 1958 |
| 2,865,931 | Mack et al. | Dec. 23, 1958 |

FOREIGN PATENTS

| | | |
|---|---|---|
| 777,621 | Great Britain | June 26, 1957 |

OTHER REFERENCES

Morrell et al.: J. Chem. Soc., pages 2251–4 (1932).
Teeter et al.: J. Am. Oil Chem. Soc., May 1948, pages 158–62.